(12) United States Patent
Han

(10) Patent No.: US 11,457,082 B2
(45) Date of Patent: Sep. 27, 2022

(54) SERVICE PROCESSING METHOD AND APPARATUS OF SERVICE-BASED ARCHITECTURE

(71) Applicant: HUAWEI TECHNOLOGIES CO., LTD., Guangdong (CN)

(72) Inventor: Tingjun Han, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 154 days.

(21) Appl. No.: 16/832,952

(22) Filed: Mar. 27, 2020

(65) Prior Publication Data

US 2020/0228613 A1    Jul. 16, 2020

Related U.S. Application Data

(63) Continuation of application No. PCT/CN2018/106193, filed on Sep. 18, 2018.

(30) Foreign Application Priority Data

Sep. 29, 2017  (CN) .......................... 201710911472.6

(51) Int. Cl.
*H04L 67/56*  (2022.01)
*H04L 67/2876*  (2022.01)
(Continued)

(52) U.S. Cl.
CPC .......... *H04L 67/51* (2022.05); *H04L 67/2871* (2013.01); *H04L 67/2876* (2013.01); *H04L 67/561* (2022.05)

(58) Field of Classification Search
CPC . H04L 67/16; H04L 67/2804; H04L 67/2871; H04L 67/2876; H04L 65/1073;
(Continued)

(56) References Cited

U.S. PATENT DOCUMENTS 6,167,446 A  *  12/2000  Lister ................ H04L 29/12009
                                                             709/224
7,933,290 B2 *  4/2011  Aholainen .............. H04L 67/16
                                                             370/466
(Continued)

FOREIGN PATENT DOCUMENTS

| CN | 101009567 A | 8/2007 |
| CN | 103580937 A | 2/2014 |
| WO | 2007085592 A1 | 8/2007 |

OTHER PUBLICATIONS

SA WG2 Meeting # 122, "TS 23.502 NRF Services", San Jose, Del Cabo, Mexico, Jun. 26-30, 2017.*
(Continued)

*Primary Examiner* — Aftab N. Khan
(74) *Attorney, Agent, or Firm* — Womble Bond Dickinson (US) LLP

(57) ABSTRACT

This application provides a service processing method and apparatus of a service-based architecture. In the method, a service customer sends a service query request to a network element repository function entity NRF; the NRF receives the service query request, determines a service address of a service proxy that matches a service requested by the service query request, and sends the service address of the service proxy to the service customer; the service customer receives the service address of the service proxy that matches the service requested by the service query request; the service customer sends a service request to the service proxy corresponding to the service address, and establishes a service channel with the service proxy corresponding to the service address. No service function of a service provider needs to be optimized, so that impact on an original service of the service provider can be avoided to some extent.

7 Claims, 10 Drawing Sheets

(51) Int. Cl.
*H04L 67/51* (2022.01)
*H04L 67/2871* (2022.01)
*H04L 67/561* (2022.01)

(58) Field of Classification Search
CPC ....... H04L 65/105; H04L 29/06; H04L 67/26; H04L 41/0823; H04L 63/0876; H04L 67/28; H04L 67/327; H04W 4/50
See application file for complete search history.

(56) References Cited

U.S. PATENT DOCUMENTS

| | | | | |
|---|---|---|---|---|
| 10,425,411 | B2* | 9/2019 | Huang | H04L 9/3268 |
| 10,743,279 | B2* | 8/2020 | Vrzic | H04W 48/17 |
| 11,153,929 | B2* | 10/2021 | Dao | H04W 36/0022 |
| 2008/0091812 | A1* | 4/2008 | Lev-Ran | H04L 61/1576 |
| | | | | 709/224 |
| 2010/0322213 | A1* | 12/2010 | Liu | H04W 48/16 |
| | | | | 370/338 |
| 2011/0265155 | A1* | 10/2011 | Liu | H04L 67/2804 |
| | | | | 726/5 |
| 2014/0201809 | A1* | 7/2014 | Choyi | H04L 63/0807 |
| | | | | 726/3 |
| 2014/0214958 | A1* | 7/2014 | Cheshire | H04L 61/1511 |
| | | | | 709/204 |
| 2017/0006126 | A1* | 1/2017 | Long, III | H04L 63/10 |
| 2017/0303259 | A1* | 10/2017 | Lee | H04W 28/16 |
| 2017/0332421 | A1* | 11/2017 | Sternberg | H04L 12/4641 |
| 2018/0376444 | A1* | 12/2018 | Kim | H04W 74/0833 |
| 2019/0238425 | A1* | 8/2019 | Mladin | H04L 41/5048 |
| 2020/0028921 | A1* | 1/2020 | Cai | H04L 67/303 |
| 2020/0068391 | A1* | 2/2020 | Liu | H04L 63/162 |
| 2020/0177677 | A1* | 6/2020 | Yang | H04L 67/1097 |

OTHER PUBLICATIONS

S2-174505 ZTE,"TS 23.502 NRF Service",SA WG2 Meeting #122,Jun. 26 30, 2017, San Jose Del Cabo, M xico, total 3 pages.

S2-175060 Nokia et al.,"TS 23.502: NRF Services and Service operations",SA WG2 Meeting #122,Jun. 26-30, 2017, San Jose Del Cabo, Mexico,total 3 pages.

S2-176359 T-Mobile USA Inc et al.,"Roaming and Proxy Function",SA WG2 Meeting #122bis,Aug. 21-25, 2017, Sophia Antipolis, France,total 5 pages.

S2-175508 China Mobile,"23.502 on NF service discovery procedures by NRF",SA WG2 Meeting #122Bis,Aug. 21-25, 2017, Sophia Antipolis, France,total 4 pages.

3GPP TR 29.891 V1.0.0 (Sep. 2017),3rd Generation Partnership Project;Technical Specification Group Core Network and Terminals;5G System—Phase 1;CT WG4 Aspects(Release 15),total 132 pages.

* cited by examiner

SERVICE PROCESSING METHOD AND APPARATUS OF SERVICE-BASED ARCHITECTURE

CROSS-REFERENCE TO RELATED APPLICATIONS

This application is a continuation of International Application No. PCT/CN2018/106193, filed on Sep. 18, 2018, which claims priority to Chinese Patent Application No. 201710911472.6, filed on Sep. 29, 2017. The disclosures of the aforementioned applications are hereby incorporated by reference in their entireties.

TECHNICAL FIELD

This application relates to the field of communications technologies, and in particular, to a service processing method and apparatus of a service-based architecture.

BACKGROUND

A service-based architecture solution based on a cloud and virtualization technology and centered on a network function (NF) is proposed in a discussion of a network architecture of a core network of a 5G network.

In the service-based architecture solution, a network element repository function entity (NRF) provides a service registration function and a service discovery function for a core network (NF). All NFs are located in a full interworking network topology, to decouple a physical deployment location between specific services.

Currently, during a service processing process of a service-based architecture, in a service registration phase, a service provider sends a registration request to the NRF and performs registration; and the NRF stores registration information of the service provider, where the registration information includes an access address of the service provider. In a service discovery phase, a service customer sends a service query request to the NRF; the NRF sends the access address of the service provider to the service customer; and the service customer sends a service request to the service provider based on the access address. The service provider forwards the service request of the service customer to a service proxy after receiving the service request of the service customer, and the service proxy performs service processing.

During the foregoing service processing process of the service-based architecture, in which, the service provider forwards the service request of the service customer to a service proxy may be understood as an extension mechanism provided by the service provider. However, in the network architecture of the core network of the service-based architecture, optimization and enhancement based on an existing service is a common innovation scenario. If the foregoing service processing procedure is used, the service provider needs to be optimized during each optimization and enhancement of a service, thereby affecting an original service of the service provider.

SUMMARY

Embodiments of this application provide a service processing method and apparatus of a service-based architecture, to reduce impact on an original service of a service provider during optimization and enhancement of a service.

According to a first aspect, a service processing method of a service-based architecture is provided. In the method, a service customer sends a service query request to an NRF; the NRF receives the service query request sent by the service customer, determines a service address of a service proxy that matches a service requested by the service query request, and sends the service address of the matched service proxy to the service customer; and the service customer receives the service address of the service proxy sent by the NRF, and may send, based on the service address of the service proxy, a service request to the service proxy and establish a service channel with the service proxy. No service function of a service provider needs to be optimized, so that impact on an original service of the service provider can be avoided to some extent.

The service requested by the service query request may be understood as the service provider. The service proxy that matches the service requested by the service query request means that the proxied service includes the service proxy of the service requested by the service query request.

In one embodiment, the NRF provides an independent service proxy registration interface for the service proxy to perform registration. The service proxy registration interface is a service-based interface different from a service provider registration interface used by the service provider to perform information registration. The service proxy sends a registration request to the NRF by using the independent service proxy registration interface. The NRF receives, by using the service proxy registration interface, the registration request sent by the service proxy, verifies legality of the service proxied by the service proxy, and stores registration information of the service proxy when the service is verified to be legal. The registration information includes the service address of the service proxy.

In this embodiment of this application, the service proxy performs the information registration by using the independent service proxy registration interface, so that the impact on the original service of the service provider can be reduced.

In one embodiment, the service provider sends a registration request to the NRF by using the service provider registration interface, and the NRF receives the registration request sent by the service provider and stores registration information of the service provider. The registration information of the service provider includes information such as a name of the service provider and a service address of the service provider. After receiving the registration request of the service proxy by using the service proxy registration interface, the NRF may send, to the service proxy, a service address of a service provider proxied by the service proxy. The service proxy receives the service request sent by the service customer, processes the service request based on a requirement implemented by a service function of the service proxy, and then may send, based on the received service address of the service provider, the service request to the service provider requested by the service query request. The service provider receives the service request sent by the service proxy, performs service processing, and then sends a response message for the service processing to the service proxy. The service proxy receives the response message sent by the service provider, processes the response message based on a requirement, and then sends the response message to the service customer.

In one embodiment, there is at least one service proxied by the service proxy.

In one embodiment, after receiving, by using the service proxy registration interface, the registration request sent by the service proxy, the NRF stores, in a form of a service proxy linked list, a name of the service proxy and a name of the service proxied by the service proxy, where the service proxy linked list further includes one or more other service proxies that have a proxy relationship and/or a proxied relationship with the service proxy and that are arranged in order, and each of the other service proxies corresponds to one service proxy name.

Correspondingly, the NRF may determine the service address of the service proxy that matches the service requested by the service query request in the following manner: determining, by the NRF, a service proxy linked list including a service name of the service requested by the service query request; traversing, by the NRF, the service proxy names of the service proxies included in the service proxy linked list, and determining whether the traversed service proxy names includes a service proxy name that matches a service customer name included in a service customer digital certificate; and if the service proxy names traversed by the NRF include the service proxy name that matches the service customer name included in the service customer digital certificate, determining, in the service proxy linked list, a service address of a former service proxy proxied by the service proxy corresponding to the matched service proxy name, and determining the determined service address of the former service proxy as the service address of the service proxy that matches the service requested by the service query request.

Further, if the service proxy names traversed by the NRF include no service proxy name that matches the service customer name included in the service customer digital certificate, a service address of the last service proxy in the service proxy linked list is determined as the service address of the service proxy that matches the service requested by the service query request.

In this embodiment of this application, the service address of the service proxy that matches the service requested by the service query request is determined by determining whether service names included in the service proxy linked list include a service name of a service proxy that matches the service customer name included in an extension field of the service customer digital certificate, so that nested deployment of the service proxy can be supported. Further, the service address of the service proxy that matches the service requested by the service query request can be determined in a relatively accurate manner, thereby avoiding an infinite loop when the service proxy is in a nested deployment status.

According to a second aspect, a service processing apparatus having a service-based architecture is provided. The service processing apparatus may be applied to an NRF, and the service processing apparatus applied to the NRF has a function of implementing the NRF in the first aspect and any embodiment of the first aspect. The function may be implemented through hardware, or may be implemented in a manner that the hardware executes related software. The hardware or the software includes one or more modules corresponding to the foregoing function. The module may be software and/or hardware.

In one embodiment, the service processing apparatus applied to the NRF includes a receiving unit, a processing unit, and a sending unit. The receiving unit, the processing unit, and the sending unit may correspond to the foregoing functional operations performed by the NRF, and details are not described herein again.

In one embodiment, the service processing apparatus applied to the NRF includes a processor, a receiver, a transmitter, and a memory. The memory is coupled to the processor, and is configured to store various software programs and/or a plurality of sets of instructions. The processor invokes a storage program or an instruction of the memory to perform the functional operations performed by the NRF, and controls a transceiver to send and receive a signal.

According to a third aspect, a service processing apparatus having a service-based architecture is provided. The service processing apparatus may be applied to a service customer, and the service processing apparatus applied to the service customer has a function of implementing the service customer in the first aspect and any embodiment of the first aspect. The function may be implemented through hardware, or may be implemented in a manner that the hardware executes related software. The hardware or the software includes one or more modules corresponding to the foregoing function. The module may be software and/or hardware.

In one embodiment, the service processing apparatus applied to the service customer includes a sending unit, a receiving unit, and a processing unit. The sending unit, the receiving unit, and the processing unit may correspond to the foregoing functional operations performed by the service customer, and details are not described herein again.

In one embodiment, the service processing apparatus applied to the service customer includes a processor, a transceiver, and a memory. The memory is coupled to the processor, and is configured to store various software programs and/or a plurality of sets of instructions. The processor invokes a storage program or an instruction of the memory to perform the functional operations performed by the service customer, and controls a receiver and a transmitter to receive and send data.

According to a fourth aspect, a service processing apparatus having a service-based architecture is provided. The service processing apparatus may be applied to a service proxy, and the service processing apparatus applied to the service proxy has a function of implementing the service proxy in the first aspect and any embodiment of the first aspect. The function may be implemented through hardware, or may be implemented in a manner that the hardware executes related software. The hardware or the software includes one or more modules corresponding to the foregoing function. The module may be software and/or hardware.

In one embodiment, the service processing apparatus applied to the service proxy includes a receiving unit and a sending unit. The receiving unit and the sending unit may correspond to the foregoing functional operations performed by the service proxy, and details are not described herein again.

In one embodiment, the service processing apparatus applied to the service proxy includes a receiver and a transmitter, and may further include a processor and a memory. The memory is coupled to the processor, and is configured to store various software programs and/or a plurality of sets of instructions. The processor invokes a storage program or an instruction of the memory to perform the functional operations performed by the service proxy, controls a receiver to receive a signal, and controls a transmitter to transmit a signal.

According to a fifth aspect, a computer storage medium is provided. The computer storage medium stores a computer instruction. When the instruction is run on the computer, any function of the NRF, the service customer, or the service proxy in the first aspect and any embodiment of the first aspect may be completed.

According to a sixth aspect, a computer program product is provided. The computer program product includes a computer program. The computer program is configured to perform and complete any function of the NRF, the service customer, or the service proxy in the first aspect and any embodiment of the first aspect.

The embodiments of this application provide a service processing method and apparatus of a service-based architecture. A service customer sends a service query request to an NRF; the NRF receives the service query request sent by the service customer, determines a service address of a service proxy that matches a service requested by the service query request, and sends the service address of the matched service proxy to the service customer; and the service customer receives the service address of the service proxy sent by the NRF, and may send, based on the service address of the service proxy, a service request to the service proxy and establish a service channel with the service proxy. No service function of a service provider needs to be optimized, so that impact on an original service of the service provider can be avoided to some extent.

DESCRIPTION OF EMBODIMENTS

The following describes technical solutions in embodiments of this application with reference to accompanying drawings.

Figure 1:
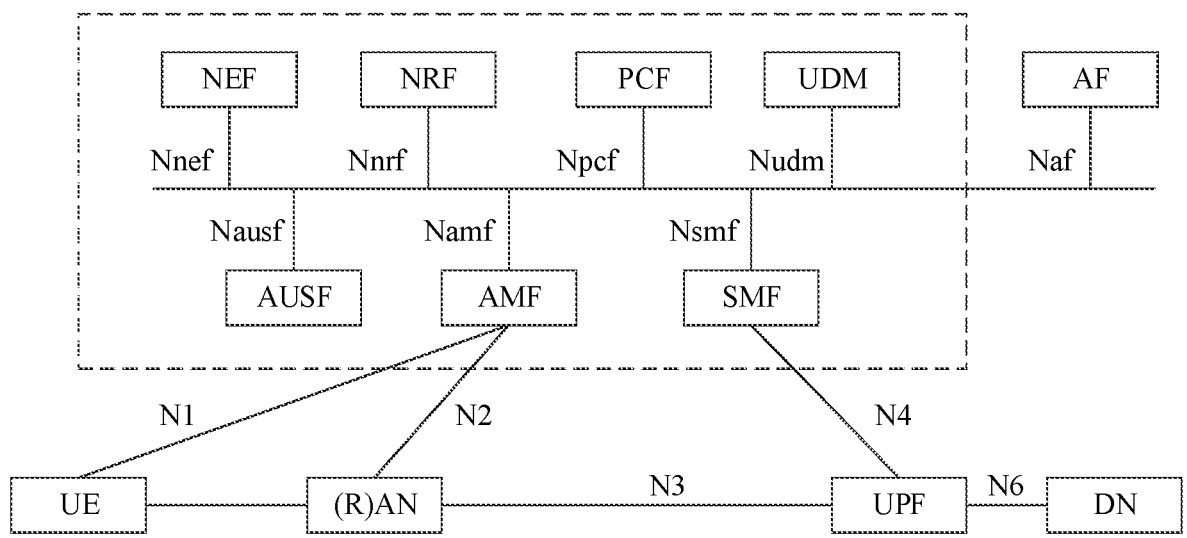
FIG. 1 is a service-based architecture to which a service processing method is applied according to an embodiment of this application.

A registration method provided in the embodiments of this application may be applied to a service-based architecture shown in FIG. 1. In FIG. 1, in a service-based architecture of a core network control plane, decoupling and integration between NFs are implemented through modularization, and service-based interfaces are used for interaction between the NFs. For example, in FIG. 1, the service-based interfaces such as a service-based interface exhibited by NEF (Nnef), a service-based interface exhibited by AUSF (Nausf), a service-based interface exhibited by NRF (Nnrf), a service-based interface exhibited by AMF (Namf), a service-based interface exhibited by PCF (Npcf), a service-based interface exhibited by SMF (Nsmf), a service-based interface exhibited by UDM (Nudm), and a service-based interface exhibited by AF (Naf) may be used for the interaction between the NFs such as a network exposure function (NEF), an NRF, a policy control function (PCF), unified data management (UDM), an application function (AF), an authentication server function (AUSF), an access and mobility management function (AMF), and a session management function (SMF), and a same service may be invoked by a plurality of NFs, thereby reducing coupling degrees of interface definitions between the NFs and implementing on-demand customization of the NFs. In FIG. 1, user equipment (UE) may access the AMF of a core network through a radio access network (RAN), or may directly access the AMF. An interface between the UE and the AMF is an N1 interface, and an interface between the RAN and the AMF is an N2 interface. The RAN may interact with a user plan function (UPF) by using an N3 interface. The UPF may access the SMF of the core network by using an N4 interface and interact with the core network, or may access a data network (DN) by using an N6 interface and interact with the DN.

The network element names and the interface definitions shown in FIG. 1 are definitions used in a 5th generation (5G) and 3rd generation mobile communication standards organization (3GPP) draft, and the figure is only a simple description of the interface definitions between network function entities. Blocks represent particular NF definitions, and lines represent the interface definitions. For particular definitions, refer to relevant definitions in the 5G 3GPP draft.

During a service processing process of the service-based architecture, an NF having a service customer function sends a service query request to an NRF, and the NRF sends, based on stored registration information, a service address of an NF having a service provider function to the NF having the service customer function. The NF having the service customer function sends, based on the service address, a service request to the NF having the service provider function, and then the NF having the service provider function forwards the received service request to a service proxy. By using the procedure for service processing, the NF having the service provider function needs to be optimized during each optimization and enhancement of a service, thereby affecting an original service of the NF having the service provider function.

In view of this, this application provides a service processing method of a service-based architecture. When receiving a service query request of a service customer, an NRF determines a service address of a service proxy that matches a service requested by the service query request, and sends the determined service address of the service proxy to the service customer. The service customer may establish, based on the service address of the service proxy, a service channel with the service proxy. No service function of a service provider needs to be optimized, so that impact on an original service of the service provider can be avoided to some extent.

Figure 2:
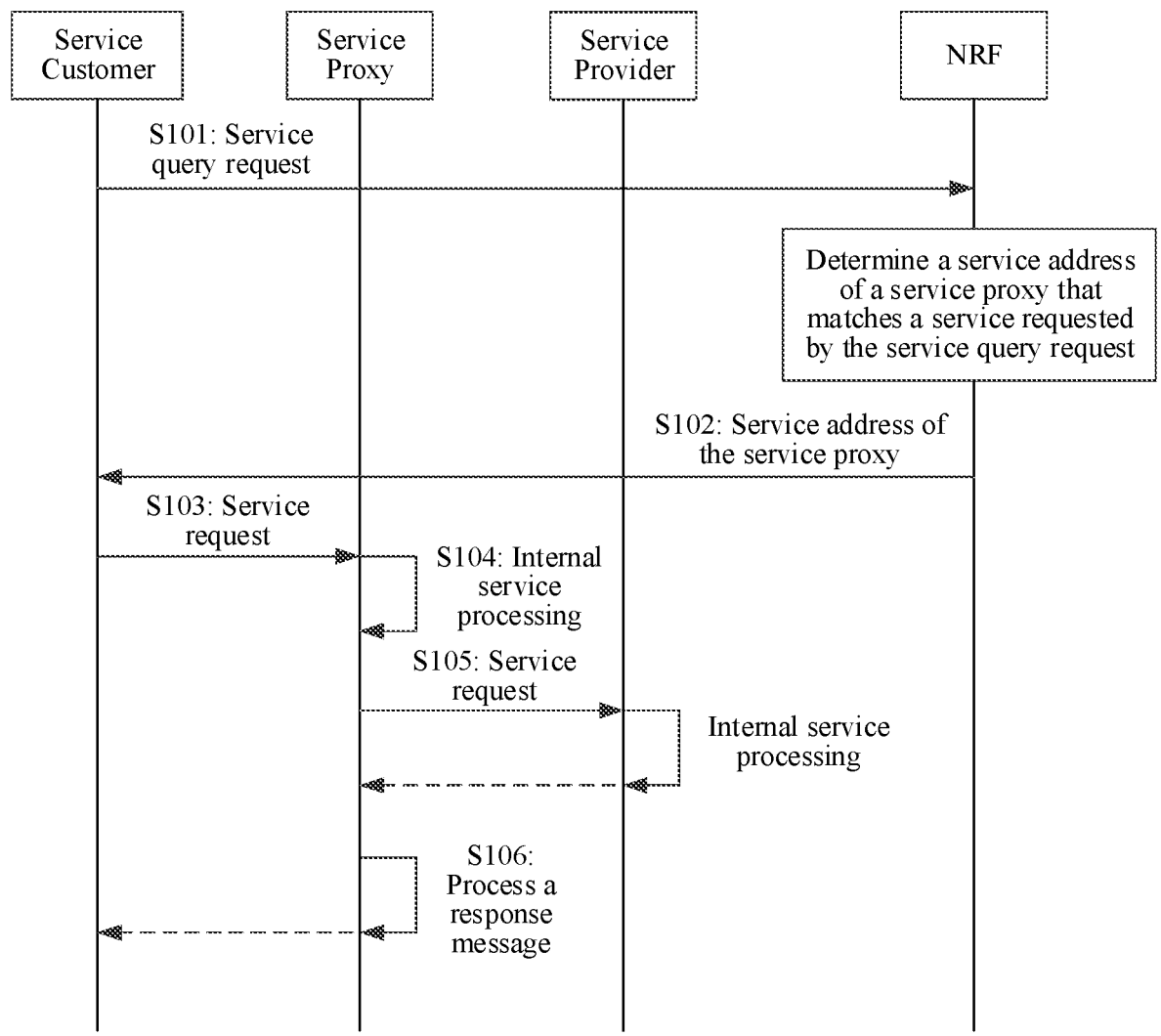
FIG. 2 is a flowchart of an implementation of a service processing method of a service-based architecture according to an embodiment of this application.

FIG. 2 is a flowchart of an implementation of a service processing method of a service-based architecture according to an embodiment of this application. Referring to FIG. 2, the method includes the following operations.

S101: A service customer sends a service query request to an NRF.

In this embodiment of this application, when determining that a service needs to be requested, the service customer may send the service query request to the NRF. The service query request may also be referred to as a discovery request.

The service query request sent by the service customer to the NRF may include parameter information of the service requested by the service customer, or the like.

S102: The NRF receives the service query request sent by the service customer, determines a service address of a service proxy that matches a service requested by the service query request, and sends the determined service address of the service proxy to the service customer.

In this embodiment of this application, the NRF pre-stores registration information of the service proxy. The registration information of the service proxy includes a name and a service address of the service proxy, a name of a service proxied by the service proxy, and the like. After receiving the service query request sent by the service customer, the NRF may determine, based on the stored registration information, that the proxied service includes a service proxy of the service requested by the service query request, and use the service proxy that is included in the proxied service and that is of the service requested by the service query request as the service proxy that matches the service requested by the service query request. The NRF determines a service address of the service proxy that matches the service requested by the service query request, and sends, to the service customer, the determined service address of the service proxy that matches the service requested by the service query request.

S103: The service customer receives the service address of the service proxy sent by the NRF, sends a service request to the service proxy corresponding to the service address, and establishes a service channel with the service proxy corresponding to the service address.

S104: The service proxy receives the service request sent by the service customer, processes the service request based on a requirement implemented by a service function of the service proxy, and then sends the service request to the service requested by the service query request, where the service requested by the service query request is proxied by the service proxy.

The service proxy may process the service request based on the requirement implemented by the service function of the service proxy. For example, the service request may be processed by performing the service functions such as data acquisition, parameter optimization, invocations, and delay measurement.

In the embodiments of this application, for ease of description, a network element capable of providing the service requested by the service query request for the service customer is referred to as a service provider. The service provided by the service provider is proxied by the service proxy.

In this embodiment of this application, the service proxy may pre-obtain a service address of the proxied service provider, and then send, based on the service address of the service provider, the received service request to the service provider.

S105: The service provider receives the service request sent by the service proxy, performs service processing, and then sends a response message for the service processing to the service proxy.

S106: The service proxy receives the response message sent by the service provider, processes the response message based on a requirement, and then sends the response message to the service customer.

In this embodiment of this application, when receiving a service query request of a service customer, an NRF determines a service address of a service proxy that matches a service requested by the service query request, and sends the determined service address of the service proxy to the service customer. The service customer may establish, based on the service address of the service proxy, a service channel with the service proxy. No service function of a service provider needs to be optimized, so that impact on an original service of the service provider can be avoided to some extent.

In the embodiments of this application, an implementation process of the service processing method of the service-based architecture in the foregoing embodiment is described below with reference to an actual application.

In the embodiments of this application, the NRF may provide an independent service proxy registration interface for the service proxy to perform registration. The service proxy registration interface may be understood as a service-based interface different from a service provider registration interface used by the service provider to perform information registration. The service proxy performs the information registration by using the independent service proxy registration interface, so that the impact on the original service of the service provider can be reduced.

Figure 3:
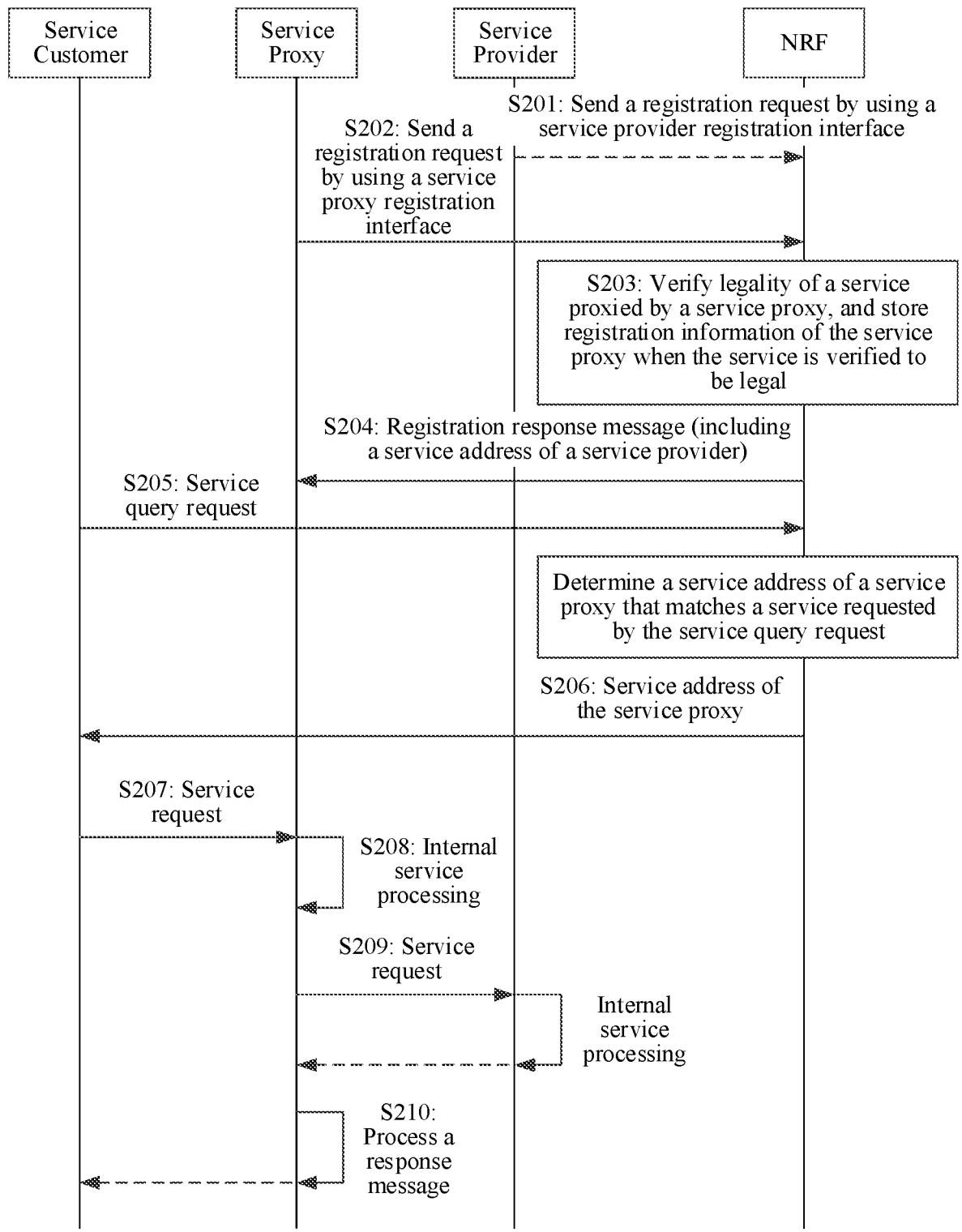
FIG. 3 is a flowchart of another implementation of a service processing method of a service-based architecture according to an embodiment of this application.

FIG. 3 is a flowchart of another implementation of a service processing method of a service-based architecture according to an embodiment of this application. Referring to FIG. 3, the method includes the following operations.

S201: A service provider sends a registration request to an NRF by using a service provider registration interface, and the NRF receives the registration request sent by the service provider and stores registration information of the service provider. The registration information of the service provider includes information such as a name of the service provider and a service address of the service provider.

A process of S201 may be implemented by using an existing technology, and details are not described herein again.

S202: A service proxy sends a registration request to the NRF by using a service proxy registration interface.

In this embodiment of this application, the registration request sent by the service proxy includes a service name of a service proxied by the service proxy. For example, if a function of the service provider is proxied by the service proxy, the registration request includes a name of the proxied service provider.

In one embodiment, there may be one or more (at least two) services proxied by the service proxy, that is, the registration request sent by the service proxy includes one or at least two service names of the services proxied by the service proxy.

S203: The NRF receives, by using the service proxy registration interface, the registration request sent by the service proxy, verifies legality of a service proxied by the service proxy, and stores registration information of the service proxy when the service is verified to be legal. The registration information includes a service address of the service proxy.

In this embodiment of this application, a secure channel may be established between the service proxy and the NRF, and two-way authentication may be performed between the service proxy and the NRF. In this embodiment of this application, the NRF may authenticate, by verifying the legality of the service proxied by the service proxy, the registration request sent by the service proxy. If the service proxied by the service proxy is verified to be legal, the NRF determines that the registration request sent by the service proxy is legal, and may further store the registration information of the service proxy.

In this embodiment of this application, a security rule used for security authentication may be preset in an extension field of a service proxy digital certificate. For example, information such as the service name of the service proxied by the service proxy may be preset in the extension field of the service proxy digital certificate. The service proxy sends the digital certificate having the preset security rule to the NRF. The NRF receives the digital certificate and the registration request that are sent by the service proxy. When performing security authentication on the registration request sent by the service proxy, the NRF may determine whether content (the service name of the service proxied by the service proxy) included in the registration request sent by the service proxy is included in the extension field of the service proxy digital certificate. If the content (the service name of the service proxied by the service proxy) included in the registration request sent by the service proxy is included in the extension field of the service proxy digital certificate, it may be determined that the service proxied by the service proxy is legal and further determined that the registration request sent by the service proxy is legal, so that the NRF may store the registration information of the service proxy.

In this embodiment of this application, the registration information of the service proxy stored by the NRF includes at least the service address of the service proxy, so that when receiving a service query request of a service customer, the NRF determines a service address of a service proxy that matches a service requested by the service query request, and sends the determined service address of the service proxy to the service customer.

Further, in this embodiment of this application, the registration information of the service proxy stored by the NRF may further include the service name of the service proxy.

S204: The NRF sends a registration response message to the service proxy, where the registration response message includes a message used to indicate whether the service proxy succeeds in registering in the NRF.

Further, the registration response message sent by the NRF to the service proxy may further include a service address of the service proxied by the service proxy, for example, may further include the service address of the service provider, so that after receiving a service request sent by the service customer, the service proxy may forward, based on the received service address of the service proxied by the service proxy, the received service request to the service that matches the service requested by the service query request sent by the service customer.

It may be understood that if the registration response message sent by the service proxy includes no service address of the service proxied by the service proxy, the service proxy may obtain the service address from the NRF by using a service discovery interface when the service request needs to be forwarded to the service proxied by the service proxy.

In this embodiment of this application, a registration process of the service proxy in the NRF is implemented through the foregoing process, and the security authentication is performed on the registration request in the registration process.

In a service discovery phase, after receiving the service query request sent by the service customer, the NRF may determine, based on the stored registration information, the service address of the service proxy that matches the service requested by the service query request.

In the service discovery phase, implementation processes of S205, S206, S207, S208, S209, and S210 are similar to implementation processes of S101, S102, S103, S104, S105, and S106 in the foregoing embodiment. For same parts, details are not described herein again. The following only describes differences.

It may be understood that, in this embodiment of this application, if there are at least two services proxied by the service proxy, the service processing manner in the foregoing embodiment may be used to perform service processing on each service proxied by the service proxy.

Further, in this embodiment of this application, a plurality of service proxies may alternatively send registration requests to the NRF. In this embodiment of this application, after receiving the registration requests sent by the plurality of service proxies, the NRF may determine, based on registration information of the service proxies, proxy relationships and proxied relationships between the plurality of service proxies, and store, in a form of a service proxy linked list, the plurality of service proxies having the proxy and proxied relationships.

The proxy relationship and the proxied relationship may be understood as follows: Assuming that a service proxy A is proxied by a service proxy B, that the service proxy B proxies the service proxy A may be understood that there is a proxy relationship between the service proxy B and the service proxy A, and that the service proxy A is proxied by the service proxy B may be understood that there is a proxied relationship between the service proxy A and the service proxy B.

The registration request sent by the service proxy may further include identification information of the service proxy. The identification information is used to uniquely identify the service proxy. For example, the identification information of the service proxy may be a name of the service proxy. Further, each service proxy included in the service proxy linked list corresponds to one service proxy name, and the service proxies in the service proxy linked list are identified by the service proxy names.

Further, in this embodiment of this application, the plurality of service proxies included in the service proxy linked list may be arranged in order based on the proxy and proxied relationships between the service proxies, and each service proxy corresponds to one service name. For example, assuming that service names of the service proxy A, the service proxy B, a service proxy C, and a service proxy D are respectively A, B, C, and D, the service proxy B proxies the service proxy A (the service proxy A is proxied by the service proxy B), the service proxy B is proxied by the service proxy C (the service proxy C proxies the service proxy B), and the service proxy C is proxied by the service proxy D (the service proxy D proxies the service proxy C), a service proxy linked list including the service proxy A, the service proxy B, the service proxy C, and the service proxy D may be expressed as: A→B→C→D. The service proxy linked list includes one or more service proxies arranged in order.

Figure 4:
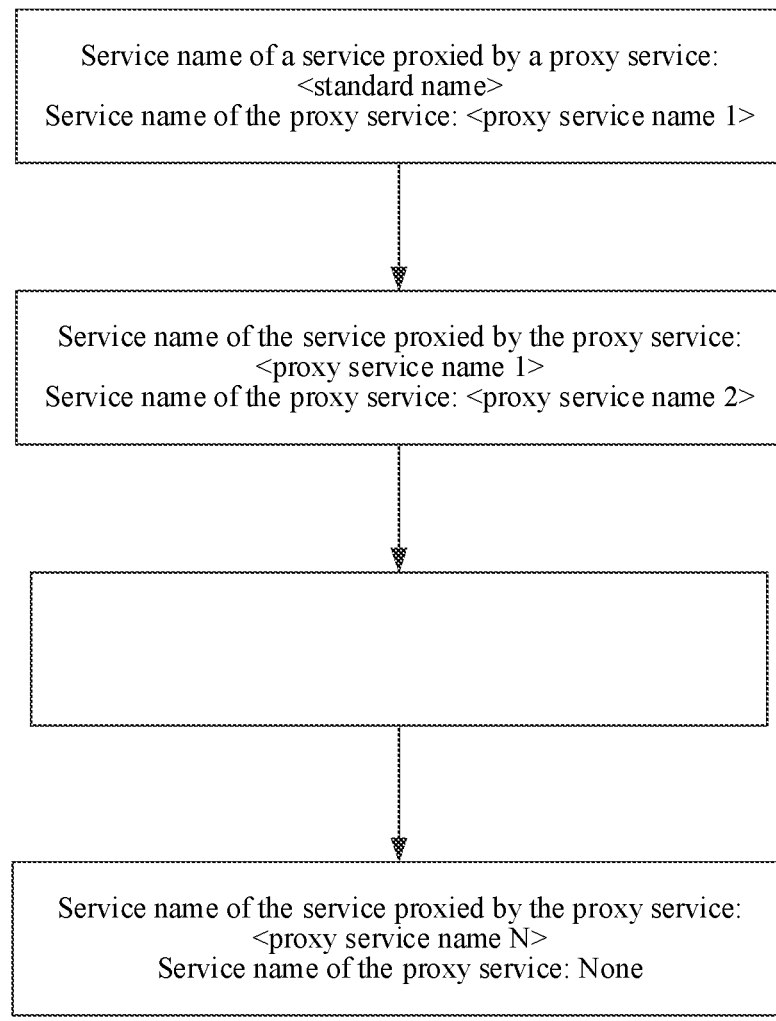
FIG. 4 is a schematic diagram of a service proxy linked list according to an embodiment of this application.

Still further, in addition to including the service name of the service proxy, the service proxy linked list may further include the service name of the service proxied by the service proxy. In one embodiment, the service proxied by the service proxy is the service proxy, and the service proxy may alternatively proxy other services, which finally forms a nested service proxy linked list, as shown in FIG. 4. The service proxy that sends the registration request may support nesting, that is, the service proxy that sends the registration request may be included in the service proxy linked list.

A service customer sends a service query request to an NRF, and the NRF receives the service query request sent by the service customer. If the NRF stores a service proxy linked list, and there is a proxy relationship and/or a proxied relationship between a service proxied by a service proxy and/or the service proxy and other service proxies in the stored service proxy linked list, the NRF may store, in a form of the service proxy linked list, a name of the service proxy and a name of the service proxied by the service proxy.

In this embodiment of this application, if the NRF stores, in the form of the service proxy linked list, the name of the service proxy and the name of the service proxied by the service proxy, the service proxy linked list further includes one or more other service proxies that have the proxy relationship and/or the proxied relationship with the service proxy and that are arranged in order, and each of the other service proxies corresponds to one service proxy name.

It may be further understood that, in this embodiment of this application, in a service discovery phase, the service customer may alternatively set a service name of a service requested by the service query request and a name of the service customer in an extension field of a service customer digital certificate, and send the service name of the service requested by the service query request and the name of the service customer to the NRF, to implement two-way authentication between the NRF and the service customer. If the extension field of the service customer digital certificate includes the service name of the service requested by the service query request and the name of the service customer, the NRF determines, by determining whether service names included in the service proxy linked list include a service name of a service proxy that matches the name of the service customer included in the extension field of the service customer digital certificate, a service address of a service proxy that matches the service requested by the service query request.

The NRF may determine the service address of the service proxy that matches the service requested by the service query request in the following manner:

determining, by the NRF, the service name of the service requested by the received service query request, determining a service proxy linked list including the service name of the service requested by the service query request, and determining the service proxy linked list including the service name of the service requested by the service query request as a service proxy linked list that matches the service requested by the service query request; traversing, by the NRF, the service proxy names of the service proxies included in the service proxy linked list that matches the service requested by the service query request, and determining whether the traversed service proxy names include the service proxy name that matches the service customer name included in the service customer digital certificate; and if the traversed service proxy names include the service proxy name that matches the service customer name included in the service customer digital certificate, determining, in the service proxy linked list, a service address of a former service proxy proxied by a service proxy corresponding to the matched service proxy name, and determining the determined service address of the former service proxy as the service address of the service proxy that matches the service requested by the service query request, or if the traversed service proxy names include no service proxy name that matches the service customer name included in the service customer digital certificate, determining a service address of the last service proxy in the service proxy linked list as the service address of the service proxy that matches the service requested by the service query request. For example, the NRF stores a service proxy linked list A→B→C→D including a service proxy A, a service proxy B, a service proxy C, and a service proxy D. If the service customer is a service proxy E, the service customer name included in the service customer digital certificate is E, and the service name included in the service query request sent by the service customer is A, after receiving the service query request sent by the service customer, the NRF determines that the service name is A and that the service proxy linked list including the service name A is A→B→C→D, and may obtain, by traversing the service proxy linked list A→B→C→D, that the service proxy names included in the service proxy linked list includes A, B, C, and D and includes no service proxy name that matches the service customer name E included in the service customer digital certificate, so that the NRF determines a service address of the last service proxy (a service address of D) in the service proxy linked list as the service address of the service proxy that matches the service requested by the service query request. If the service customer is the service proxy D, the service customer name included in the service customer digital certificate is D, and the service name included in the service query request sent by the service customer is A, after receiving the service query request sent by the service customer, the NRF determines that the service name is A and that the service proxy linked list including the service name A is A→B→C→D, and may obtain, by traversing the service proxy linked list A→B→C→D, that the service proxy names included in the service proxy linked list includes A, B, C, and D and includes a service proxy name that matches the service customer name D included in the service customer digital certificate, so that the NRF determines a service address of a former service proxy (the service proxy C) proxied by a service proxy (the service proxy D) corresponding to the matched service proxy name as the service address of the service proxy that matches the service requested by the service query request.

By using the foregoing implementation process that is in this embodiment of this application and that is of determining the service address of the service proxy that matches the service requested by the service query request, in a case in which the service proxy is used as the service customer and needs to request to obtain other service proxies proxied by the service proxy, the other service proxies proxied by the service proxy may be used as the service (service provider) proxied by the service proxy, to respond to the obtaining of the service address, and then nested deployment of the service proxy may be supported by using the foregoing implementation process that is in this embodiment of this application and that is of determining the service address of the service proxy that matches the service requested by the service query request.

Further, by using the foregoing implementation process that is in this embodiment of this application and that is of determining the service address of the service proxy that matches the service requested by the service query request, the service address of the service proxy that matches the service requested by the service query request can be determined in a relatively accurate manner, thereby avoiding infinite loop when the service proxy is in a nested deployment status. The following describes examples.

It is assumed that the service proxy linked list including the service proxy A, the service proxy B, the service proxy C, and the service proxy D is A→B→C→D, and the service proxy C requests to obtain an address of the service proxy A proxied by the service proxy C. If the implementation process that is in the foregoing embodiment of this application and that is of determining the service address of the service proxy that matches the service requested by the service query request is used, the service address of the service proxy determined by the NRF is an address of the service proxy B, and then the address of the service proxy A may be determined by using a similar determining process. If the implementation process that is in the foregoing embodiment of this application and that is of determining the service address of the service proxy that matches the service requested by the service query request is not used, the service address of the service proxy determined by the NRF may be an address of the service proxy D, the service proxy D proxies the service proxy C, and when the NRF determines a service proxied by the service proxy D, the determined service address of the service proxy is the service proxy C, which causes the infinite loop.

The solutions provided in the embodiments of this application are described above mainly from a perspective of interaction among the NRF, the service provider, the service customer, and the service proxy. It may be understood that, to implement the foregoing functions, the NRF, the service provider, the service customer, and the service proxy include corresponding hardware structures and/or software modules for performing the functions. With reference to the units and algorithm operations of the examples described in the embodiments disclosed in this application, the embodiments of this application may be implemented in a form of hardware or a combination of hardware and computer software. Whether a function is performed by the hardware or hardware driven by the computer software depends on particular applications and design constraints of the technical solutions. A person skilled in the art may use different methods to implement the described functions for each particular application, but it should not be considered that the implementation falls beyond the scope of the technical solutions in the embodiments of this application.

In the embodiments of this application, functional unit division may be performed on the NRF, the service customer, and the service proxy based on the foregoing method examples. For example, the functional unit division may be performed corresponding to the functions, or two or more functions may be integrated into one processing unit. The integrated unit may be implemented in a form of hardware, or may be implemented in a form of a software functional unit. It should be noted that, in the embodiments of this application, unit division is exemplary, and is merely a logical function division. In an actual implementation, another division manner may be used.

Figure 5:
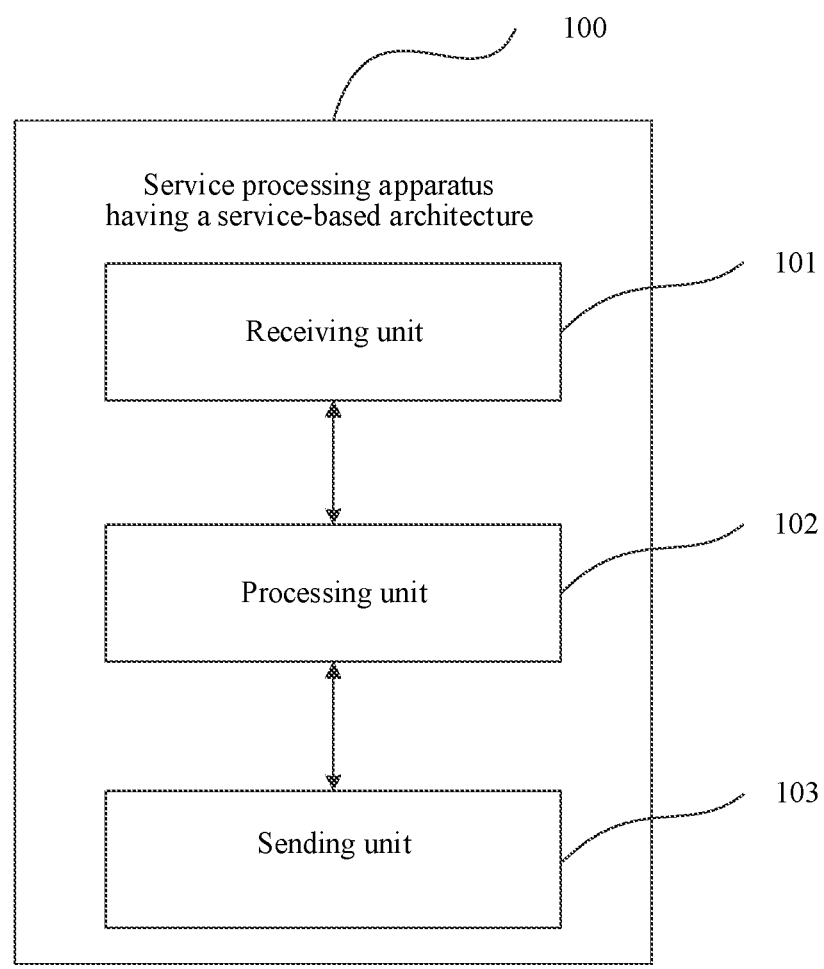
FIG. 5 is a schematic structural diagram of a service processing apparatus applied to an NRF according to an embodiment of this application.

When the integrated unit is implemented in the form of the software functional unit, FIG. 5 is a schematic structural diagram of a service processing apparatus 100 having a service-based architecture according to an embodiment of this application. The service processing apparatus 100 having the service-based architecture may be applied to an NRF. The service processing apparatus 100 applied to the NRF may include a receiving unit 101, a processing unit 102, and a sending unit 103. The receiving unit 101 is configured to receive a service query request sent by a service customer. The processing unit 102 is configured to determine a service address of a service proxy that matches a service requested by the service query request received by the receiving unit 101, where a service proxied by the service proxy includes the service (e.g., service provider) requested by the service query request. The sending unit 103 is configured to send, to the service customer, the service address of the service proxy determined by the processing unit 102.

In one embodiment, the receiving unit 101 is further configured to receive, by using a service proxy registration interface before the sending unit 103 sends the service address of the service proxy to the service customer, a registration request sent by the service proxy, where the registration request includes a service name of the service proxied by the service proxy, and the service proxy registration interface is a service-based interface different from a service provider registration interface. The processing unit 102 is further configured to verify, based on the service name that is included in the registration request received by the receiving unit 101 and that is of the service proxied by the service proxy, legality of the service proxied by the service proxy, and store the service address of the service proxy when the service is verified to be legal. The receiving unit 101 receives, by using the service proxy registration interface, the registration request sent by the service proxy, so that impact on an original service of the service provider can be reduced.

In one embodiment, the sending unit 103 is further configured to send, to the service proxy after the receiving unit 101 receives the registration request of the service proxy by using the service proxy registration interface, a service address of the service proxied by the service proxy, so that the service proxy may send, based on the received service address of the service provider, a service request to the service requested by the service query request.

There is at least one service proxied by the service proxy.

In one embodiment, the processing unit 102 is further configured to store, in a form of a service proxy linked list after the receiving unit 101 receives, by using the service proxy registration interface, the registration request sent by the service proxy, a name of the service proxy and a name of the service proxied by the service proxy, where the service proxy linked list further includes one or more other service proxies that have a proxy relationship and/or a proxied relationship with the service proxy and that are arranged in order, and each of the other service proxies corresponds to one service proxy name. The processing unit 102 determines the service address of the service proxy that matches the service requested by the service query request in the following manner:

determining a service proxy linked list that matches the service requested by the service query request; traversing the service proxy names of the service proxies included in the service proxy linked list, and determining whether the traversed service proxy names includes a service proxy name that matches a service customer name included in a service customer digital certificate; and if the traversed service proxy names include the service proxy name that matches the service customer name included in the service customer digital certificate, determining, in the service proxy linked list, a service address of a former service proxy proxied by a service proxy corresponding to the matched service proxy name, and determining the determined service address of the former service proxy as the service address of the service proxy that matches the service requested by the service query request, or if the traversed service proxy names include no service proxy name that matches the service customer name included in the service customer digital certificate, determining a service address of the last service proxy in the service proxy linked list as the service address of the service proxy that matches the service requested by the service query request.

In this embodiment of this application, the service address of the service proxy that matches the service requested by the service query request is determined by determining whether service names included in the service proxy linked list include a service name of a service proxy that matches the service customer name included in an extension field of the service customer digital certificate, so that nested deployment of the service proxy can be supported. Further, the service address of the service proxy that matches the service requested by the service query request can be determined in a relatively accurate manner, thereby avoiding an infinite loop when the service proxy is in a nested deployment status.

When the integrated unit is implemented in the form of the hardware, the receiving unit 101 may be a receiver, the processing unit 102 may be a processor, and the sending unit 103 may be a transmitter. When the receiving unit 101 is the receiver, the processing unit 102 is the processor, and the sending unit 103 is the transmitter, the service processing apparatus 100 may use a structure of an NRF shown in FIG. 6. The NRF shown in FIG. 6 is used, and the NRF may be the NRF in the foregoing method embodiment.

Figure 6:
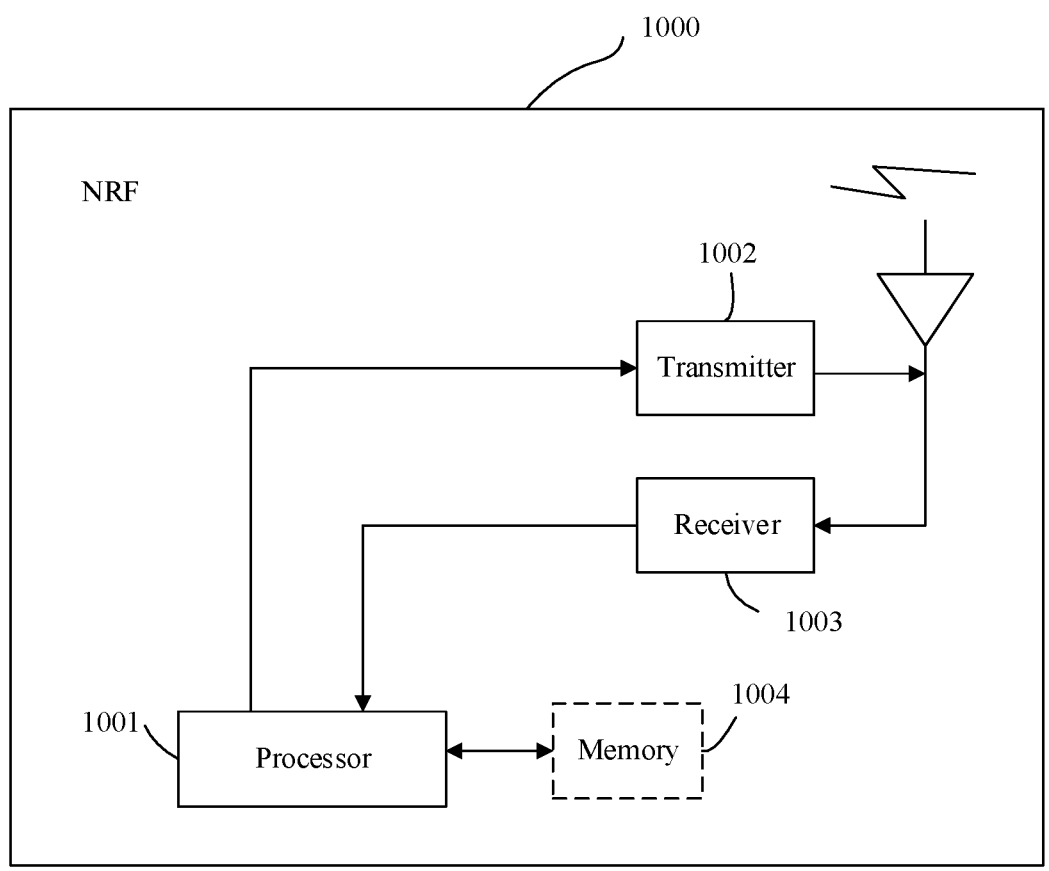
FIG. 6 is a schematic structural diagram of an NRF according to an embodiment of this application.

FIG. 6 is a schematic structural diagram of an NRF 1000 according to an embodiment of this application, that is, another schematic structural diagram of the service processing apparatus 100. Referring to FIG. 6, the NRF 1000 includes a processor 1001, a transmitter 1002, and a receiver 1003. The processor 1001 may also be a controller. The processor 1001 is configured to support the NRF 1000 in performing the functions of the NRF in FIG. 2 and FIG. 3. The transmitter 1002 and the receiver 1003 are configured to support a function of sending and receiving messages between the NRF 1000 and a service proxy, a service customer, and a service provider. The NRF 1000 may further include a memory 1004. The memory 1004 is configured to be coupled to the processor 1001. The memory 1004 stores a program instruction and data for the NRF 1000. The processor 1001, the transmitter 1002, the receiver 1003, and the memory 1004 are connected. The memory 1004 is configured to store an instruction. The processor 1001 is configured to execute the instruction stored in the memory 1004, to control the transmitter 1002 and the receiver 1003 to send and receive the data, thereby implementing the operations in which the NRF performs the corresponding function in the foregoing method.

In this embodiment of this application, for concepts, explanations and detailed descriptions, and other operations that are of the service processing apparatus 100 applied to the NRF and the NRF 1000 and that are related to the technical solutions provided in the embodiments of this application, refer to the description related to the content in the foregoing method or another embodiment. Details are not described herein again.

Figure 7:
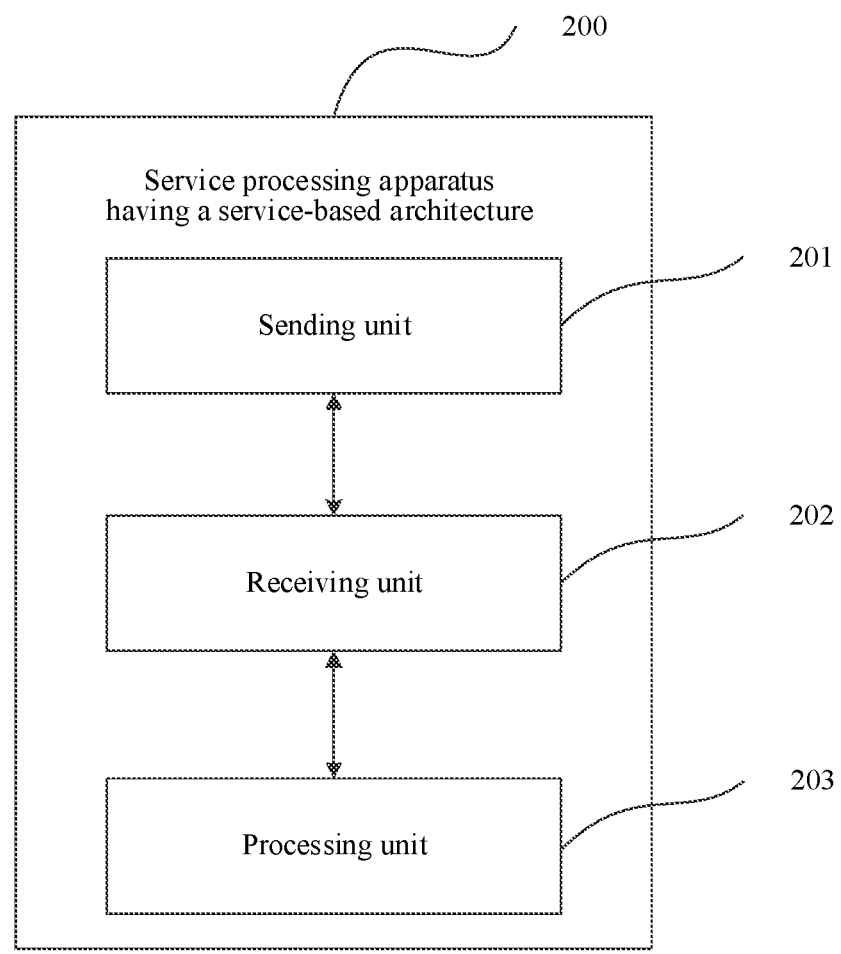
FIG. 7 is a schematic structural diagram of a service processing apparatus applied to a service customer according to an embodiment of this application.

When the integrated unit is implemented in the form of the software functional unit, FIG. 7 is a schematic structural diagram of a service processing apparatus 200 having a service-based architecture according to an embodiment of this application. The service processing apparatus 200 having the service-based architecture may be applied to a service customer. The service processing apparatus 200 applied to the service customer may include a sending unit 201, a receiving unit 202, and a processing unit 203. The sending unit 201 is configured to send a service query request and a service request to an NRF, and send the service request to a service proxy corresponding to a service address received by the receiving unit 202. The receiving unit 202 is configured to receive a service address that is sent by the NRF and that is of a service proxy that matches a service requested by the service query request sent by the sending unit 201. The processing unit 203 is configured to control the sending unit 201 to send the service request to the service proxy corresponding to the service address received by the receiving unit 202, and establish a service channel with the service proxy corresponding to the service address.

When the integrated unit is implemented in the form of the hardware, the sending unit 201 and the receiving unit 202 may be transceivers, and the processing unit 203 may be a processor. When the sending unit 201 and the receiving unit 202 are the transceivers, and the processing unit 203 is the processor, the service processing apparatus 200 may use a structure of a service customer shown in FIG. 8. The service customer shown in FIG. 8 is used, and the service customer may be the service customer in the foregoing method embodiment.

Figure 8:
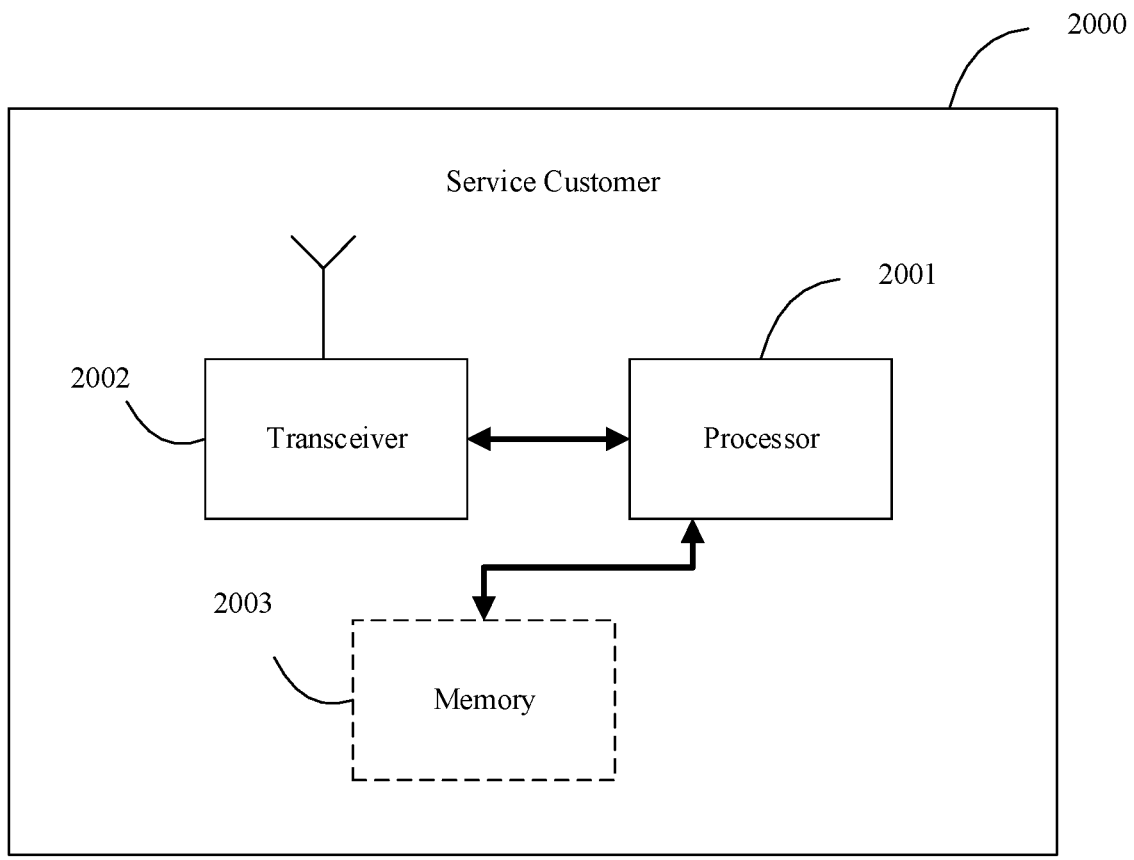
FIG. 8 is a schematic structural diagram of a service customer according to an embodiment of this application.

FIG. 8 is a schematic structural diagram of a service customer 2000 according to an embodiment of this application, that is, another schematic structural diagram of the service processing apparatus 200. Referring to FIG. 8, the service customer 2000 includes a processor 2001 and a transceiver 2002. The processor 2001 may also be a controller. The processor 2001 is configured to support the service customer 2000 in performing the functions of the service customer in FIG. 2 and FIG. 3. The transceiver 2002 is configured to support a function of sending and receiving messages between the service customer 2000 and a service proxy, an NRF, and a service provider. The service customer 2000 may further include a memory 2003. The memory 2003 is configured to be coupled to the processor 2001. The memory 2003 stores a program instruction and data for the service customer 2000. The processor 2001, the transceiver 2002, and the memory 2003 are connected. The memory 2003 is configured to store an instruction. The processor 2001 is configured to execute the instruction stored in the memory 2003, to control the transceiver 2002 to send and receive the data, thereby implementing the operations in which the service customer performs the corresponding function in the foregoing method.

In this embodiment of this application, for concepts, explanations and detailed descriptions, and other operations that are of the service processing apparatus 200 applied to the service customer and the service customer 2000 and that are related to the technical solutions provided in the embodiments of this application, refer to the description related to the content in the foregoing method or another embodiment. Details are not described herein again.

Figure 9:
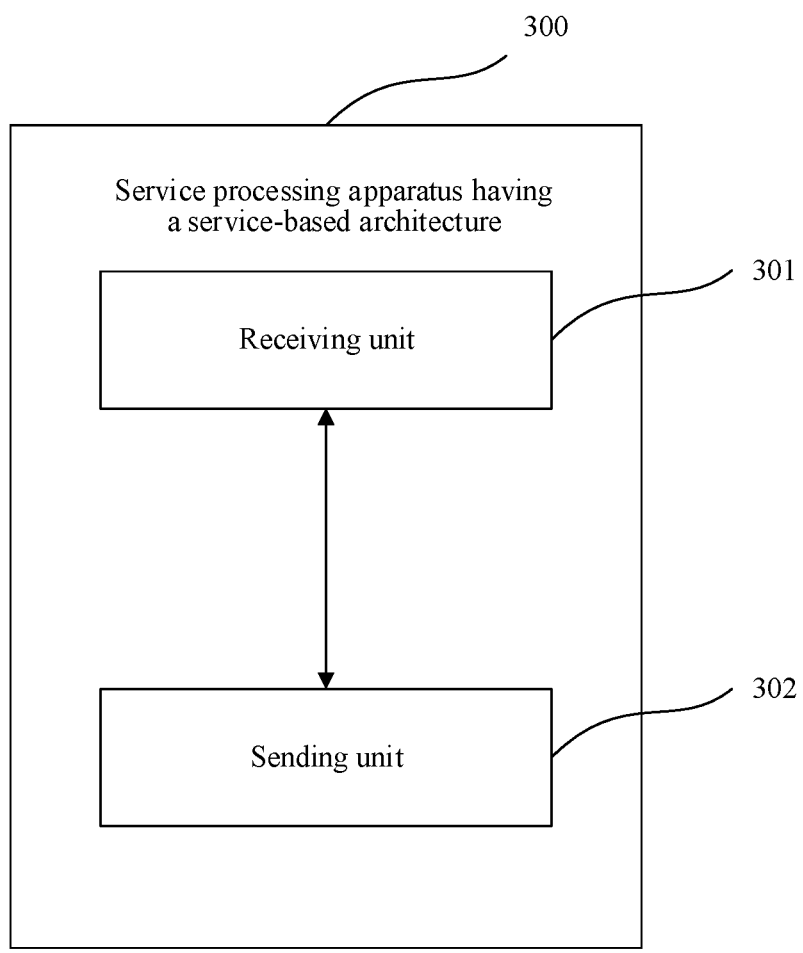
FIG. 9 is a schematic structural diagram of a service processing apparatus applied to a service proxy according to an embodiment of this application.

When the integrated unit is implemented in the form of the software functional unit, FIG. 9 is a schematic structural diagram of a service processing apparatus 300 having a service-based architecture according to an embodiment of this application. The service processing apparatus 300 having the service-based architecture may be applied to a service proxy. The service processing apparatus 300 applied to the service proxy may include a receiving unit 301 and a sending unit 302. The receiving unit 301 is configured to receive a service address that is sent by an NRF and that is of a service (e.g., service provider) proxied by the service proxy, and receive a service request sent by a service customer. The sending unit 302 is configured to send the service request received by the receiving unit 301 to a service (e.g., service provider) proxied by the service proxy corresponding to the service address received by the receiving unit 301.

In one embodiment, the sending unit 302 is further configured to send, before the receiving unit 301 receives the service address that is sent by the NRF and that is of the service (e.g., service provider) proxied by the service proxy, a registration request to the NRF by using a service proxy registration interface, where the registration request includes service names of the services (e.g., service providers) proxied by the service proxy, and the service proxy registration interface is a service-based interface different from a service provider registration interface.

There is at least one service (e.g., service provider) proxied by the service proxy.

When the integrated unit is implemented in the form of the hardware, the receiving unit 301 may be a receiver, and the sending unit 302 may be transmitter. When the receiving unit 301 is the receiver and the sending unit 302 is the transmitter, the service processing apparatus 300 may use a structure of a service proxy shown in FIG. 10. The service proxy shown in FIG. 10 is used, and the service proxy may be the service proxy in the foregoing method embodiment.

Figure 10:
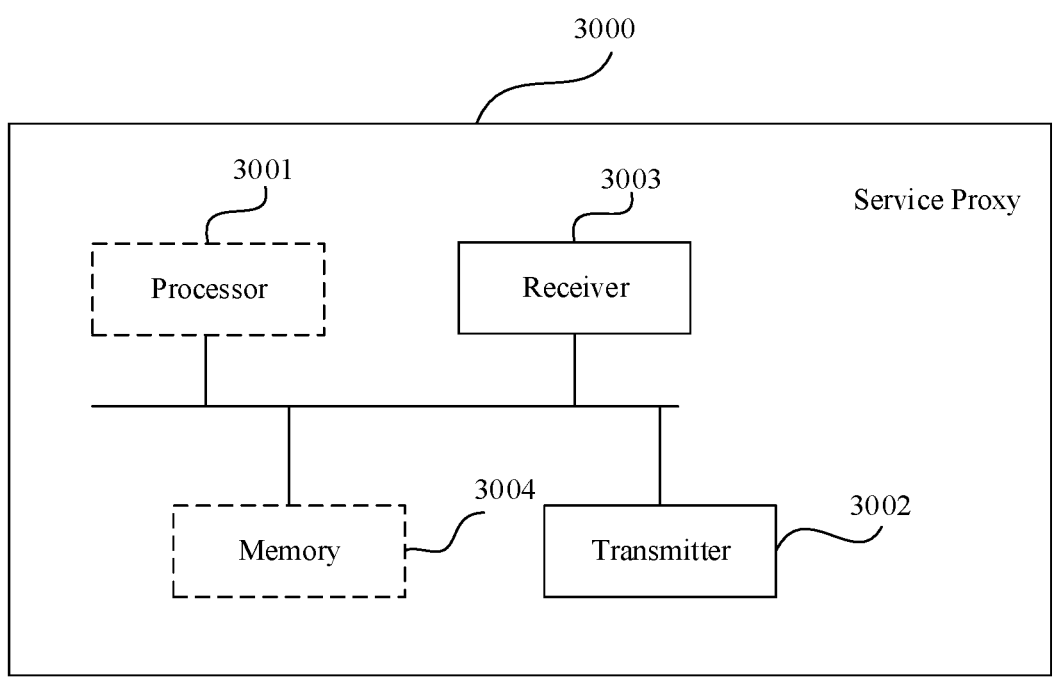
FIG. 10 is a schematic structural diagram of a service proxy according to an embodiment of this application.

FIG. 10 is a schematic structural diagram of a service proxy 3000 according to an embodiment of this application, that is, another schematic structural diagram of the service processing apparatus 300. Referring to FIG. 10, the service proxy 3000 includes a transmitter 3002 and a receiver 3003. The service proxy 3000 may further include a processor 3001. The processor 3001 may also be a controller. The processor 3001 is configured to support the service proxy 3000 in performing the functions of the service proxy in FIG. 2 and FIG. 3. The transmitter 3002 and the receiver 3003 are configured to support a function of sending and receiving messages between the service proxy 3000 and a service customer, an NRF, and a service provider. The service proxy 3000 may further include a memory 3004. The memory 3004 is configured to be coupled to the processor 3001. The memory 3004 stores a program instruction and data for the service proxy 3000. The processor 3001, the transmitter 3002, the receiver 3003, and the memory 3004 are connected. The memory 3004 is configured to store an instruction. The processor 3001 is configured to execute the instruction stored in the memory 3004, to control the transmitter 3002 and the receiver 3003 to send and receive the data, thereby implementing the operations in which the service proxy performs the corresponding function in the foregoing method.

In this embodiment of this application, for concepts, explanations and detailed descriptions, and other operations that are of the service processing apparatus 300 applied to the service proxy and the service proxy 3000 and that are related to the technical solutions provided in the embodiments of this application, refer to the description related to the content in the foregoing method or another embodiment. Details are not described herein again.

It should be noted that the processor in the embodiments of this application may be a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processor may implement or execute various exemplary logical blocks, modules, and circuits described with reference to content disclosed in this application. Alternatively, the processor may be a combination of processors implementing a computing function, for example, a combination of one or more microprocessors, or a combination of the DSP and a microprocessor.

The memory may be integrated with the processor, or may be disposed separately from the processor.

In one embodiment, functions of the receiver and the transmitter may be considered to be implemented by using a transceiver circuit or a dedicated transceiver chip. The processor may be considered to be implemented by using a dedicated processing chip, a processing circuit, a processor, or a general-purpose chip.

In one embodiment, program code used to implement functions of the processor, the receiver, and the transmitter is stored in the memory, and a general-purpose processor implements the functions of the processor, the receiver, and the transmitter by executing the code in the memory.

Based on the methods provided in the embodiments of this application, an embodiment of this application further provides a communications system, including the NRF, the service provider, the service customer, and the service proxy that are described above.

An embodiment of this application further provides a chip. The chip is connected to a memory, and is configured to read and execute a software program stored in the memory, to implement the function of the NRF, the service customer, or the service proxy in the foregoing embodiment.

An embodiment of this application further provides a computer storage medium. The computer storage medium stores some instructions. When these instructions are executed, the service processing method in the foregoing method embodiment may be implemented.

An embodiment of this application further provides a computer program product. The computer program product includes a computer program. The computer program is used to perform the service processing method in the foregoing method embodiment.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. In addition, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to flowcharts and/or block diagrams of the method, the device (e.g., system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that instructions executed by a computer or the processor of the another programmable data processing device generate an apparatus used to implement a function in one or more processes in the flowcharts and/or in one or more blocks in the block diagrams.

Alternatively, these computer program instructions may be stored in a computer readable memory that can instruct the computer or the another programmable data processing device to work in a manner, so that the instructions stored in the computer readable memory generate an artifact that includes an instruction apparatus. The instruction apparatus implements a function in one or more processes in the flowcharts and/or in one or more blocks in the block diagrams.

Alternatively, these computer program instructions may be loaded onto the computer or another programmable data processing device, so that a series of operations and operations are performed on the computer or another programmable device, thereby generating computer-implemented processing. Therefore, the instructions executed on the computer or another programmable device provide operations for implementing a function in one or more processes in the flowcharts and/or in one or more blocks in the block diagrams.

What is claimed is:

1. A service processing method of a service-based architecture comprising:
   receiving, by a network element repository function entity (NRF), a service query request sent by a service customer for a service provided by a service provider; and
   determining, by the NRF, a service address of a service proxy that matches the service requested by the service query request, and sending the service address of the service proxy to the service customer, wherein the service address of the service proxy is different from a service address of the service provider, and
   wherein a service proxied by the service proxy comprises the service provided by the service provider that is requested by the service query request,
   wherein before the sending, by the NRF, the service address of the service proxy to the service customer, the method further comprises:
   receiving, by the NRF using a service proxy registration interface, a registration request sent by the service proxy, wherein the registration request comprises a service name of the service proxied by the service proxy, wherein the service proxy registration interface is a service-based interface different from a service provider registration interface; and
   verifying, by the NRF, based on the service name of the service proxied by the service proxy, the service proxied by the service proxy, and storing the service address of the service proxy when the service is verified,
   wherein after the receiving, by the NRF using the service proxy registration interface, the registration request sent by the service proxy, the method further comprises:
   storing, by the NRF in a form of a service proxy linked list, a name of the service proxy and the service name of the service proxied by the service proxy, wherein the service proxy linked list further comprises one or more other service proxies that have at least one of a proxy relationship or a proxied relationship with the service proxy and that are arranged in order, and each of the other service proxies corresponds to one service proxy name, and
   wherein the determining, by the NRF, the service address of the service proxy that matches the service requested by the service query request comprises:
   determining, by the NRF, the service proxy linked list that matches the service requested by the service query request;
   traversing, by the NRF, the service proxy names of the service proxies comprised in the service proxy linked list, and determining whether the traversed service proxy names comprise a service proxy name that matches a service customer name comprised in a service customer digital certificate; and
   if the service proxy names traversed by the NRF comprise the service proxy name that matches the service customer name comprised in the service customer digital certificate, determining, in the service proxy linked list, a service address of a former service proxy proxied by a service proxy corresponding to the matched service proxy name, and determining the determined service address of the former service proxy as the service address of the service proxy that matches the service requested by the service query request.

2. The method according to claim 1, wherein after the receiving, by the NRF using the service proxy registration interface, the registration request sent by the service proxy, the method further comprises:
   sending, by the NRF to the service proxy, the service address of the service provider that provides the service proxied by the service proxy.

3. The method according to claim 1, wherein, if the service proxy names traversed by the NRF comprise no service proxy name that matches the service customer name comprised in the service customer digital certificate, a service address of the last service proxy in the service proxy linked list is determined as the service address of the service proxy that matches the service requested by the service query request.

4. A service processing apparatus including a service-based architecture applied to a network element repository function entity (NRF) comprising:
   a receiver circuit configured to receive a service query request sent by a service customer for a service provided by a service provider;
   a processor circuit configured to determine a service address of a service proxy that matches the service requested by the service query request received by the receiver circuit, wherein a service proxied by the service proxy comprises the service provided by the service provider that is requested by the service query request; and
   a transmitter circuit configured to send to the service customer, the service address of the service proxy determined by the processor circuit, wherein the service address of the service proxy is different from a service address of the service provider,
   wherein the receiver circuit is further configured to receive, by using a service proxy registration interface before the transmitter circuit sends the service address of the service proxy to the service customer, a registration request sent by the service proxy, wherein the registration request comprises a service name of the service proxied by the service proxy, and the service proxy registration interface is a service-based interface different from a service provider registration interface, and
   wherein the processor circuit is further configured to verify, based on the service name that is comprised in the registration request received by the receiver circuit and that is of the service proxied by the service proxy, the service proxied by the service proxy, and store the service address of the service proxy when the service is verified,
   wherein the processor circuit is further configured to store, in a form of a service proxy linked list after the receiver circuit receives, by using the service proxy registration interface, the registration request sent by the service proxy, a name of the service proxy and the service name of the service proxied by the service proxy, wherein the service proxy linked list further comprises one or more other service proxies that have at least one of a proxy relationship or a proxied relationship with the service proxy and that are arranged in order, and each of the other service proxies corresponds to one service proxy name, and wherein the processor circuit is further configured to determine the service address of the service proxy that matches the service requested by the service query request by performing operations comprising:

determining the service proxy linked list that matches the service requested by the service query request;

traversing the service proxy names of the service proxies comprised in the service proxy linked list, and determining whether the traversed service proxy names comprise a service proxy name that matches a service customer name comprised in a service customer digital certificate; and if the traversed service proxy names comprise the service proxy name that matches the service customer name comprised in the service customer digital certificate, determining, in the service proxy linked list, a service address of a former service proxy proxied by a service proxy corresponding to the matched service proxy name, and determining the determined service address of the former service proxy as the service address of the service proxy that matches the service requested by the service query request.

5. The apparatus according to claim 4, wherein the transmitter circuit is further configured to send, to the service proxy after the receiver circuit receives the registration request of the service proxy by using the service proxy registration interface, the service address of the service provider that provides the service proxied by the service proxy.

6. The apparatus according to claim 4, wherein the processor circuit is further configured to determine the service address of the service proxy that matches the service requested by the service query request by performing operations comprising:

if the traversed service proxy names comprise no service proxy name that matches the service customer name comprised in the service customer digital certificate, determining a service address of the last service proxy in the service proxy linked list as the service address of the service proxy that matches the service requested by the service query request.

7. A non-transitory computer-readable medium having instructions stored therein, which when executed by a processor, cause the processor to perform a service processing method of a service based architecture comprising:

receiving, by a network element repository function entity (NRF), a service query request sent by a service customer for a service provided by a service provider; and determining, by the NRF, a service address of a service proxy that matches the service requested by the service query request, and sending the service address of the service proxy to the service customer, wherein the service address of the service proxy is different from a service address of the service provider, and wherein a service proxied by the service proxy comprises the service provided by the service provider that is requested by the service query request, receiving, by the NRF using a service proxy registration interface, a registration request sent by the service proxy, wherein the registration request comprises a service name of the service proxied by the service proxy, wherein the service proxy registration interface is a service-based interface different from a service provider registration interface; and verifying, by the NRF, based on the service name of the service proxied by the service proxy, the service proxied by the service proxy, and storing the service address of the service proxy when the service is verified, wherein after the receiving, by the NRF using the service proxy registration interface, the registration request sent by the service proxy, the method further comprises:

storing, by the NRF in a form of a service proxy linked list, a name of the service proxy and the service name of the service proxied by the service proxy, wherein the service proxy linked list further comprises one or more other service proxies that have at least one of a proxy relationship or a proxied relationship with the service proxy and that are arranged in order, and each of the other service proxies corresponds to one service proxy name, and wherein the determining, by the NRF, the service address of the service proxy that matches the service requested by the service query request comprises:

determining, by the NRF, the service proxy linked list that matches the service requested by the service query request;

traversing, by the NRF, the service proxy names of the service proxies comprised in the service proxy linked list, and determining whether the traversed service proxy names comprise a service proxy name that matches a service customer name comprised in a service customer digital certificate; and if the service proxy names traversed by the NRF comprise the service proxy name that matches the service customer name comprised in the service customer digital certificate, determining, in the service proxy linked list, a service address of a former service proxy proxied by a service proxy corresponding to the matched service proxy name, and determining the determined service address of the former service proxy as the service address of the service proxy that matches the service requested by the service query request.

* * * * *